United States Patent [19]

Knott

[11] Patent Number: 5,120,388
[45] Date of Patent: Jun. 9, 1992

[54] OPTICAL FIBRE TERMINATION METHOD AND APPARATUS

[75] Inventor: Michael P. Knott, Manchester, England

[73] Assignee: BICC Public Limited Company, England

[21] Appl. No.: 592,860

[22] Filed: Oct. 4, 1990

[30] Foreign Application Priority Data

Oct. 10, 1989 [GB] United Kingdom ............. 8922782
Oct. 11, 1989 [GB] United Kingdom ............. 8922878

[51] Int. Cl.$^5$ .............. B32B 31/00; B29C 65/02; G02B 6/24; G02B 6/36
[52] U.S. Cl. .................. 156/294; 156/158; 156/423; 156/579; 264/1.5; 385/76
[58] Field of Search .......... 156/423, 158, 294, 579; 350/96.2; 264/1.5; 29/281.1–281.5, 234, 271–272; 385/60, 69, 76, 78, 86

[56] References Cited

U.S. PATENT DOCUMENTS 4,333,705  6/1982  Mead .................. 350/96.2

Primary Examiner—Michael W. Ball
Assistant Examiner—Adrienne C. Johnstone
Attorney, Agent, or Firm—Anthony J. Casella; Gerald E. Hespos

[57] ABSTRACT

Apparatus for use in terminating an optical fibre F in the bore of a tubular connector body C comprises a movable support 1 having first gripping means 5 for holding a tubular connector body in a fixed position on the support, second gripping means 7 for holding an optical fibre in a predetermined position in which the fibre extends through and protrudes from the bore of the connector body when so held, and a handle of thermally insulating material. A first mounting 10 for temporarily supporting the movable support 1 is of such a form that it facilitates ready positioning of the connector body C and optical fibre F. A second mounting 20, to which the movable support 1 is transferred from the first mounting 10, incorporates heating means for hardening of heat-hardenable adhesive employed to secure the optical fibre in the connector body. Reduction in the level of manual dexterity needed to ensure consistent satisfactory terminations can be achieved. A method of terminating an optical fibre in the bore of a tubular connector body using the above apparatus is also disclosed.

11 Claims, 1 Drawing Sheet

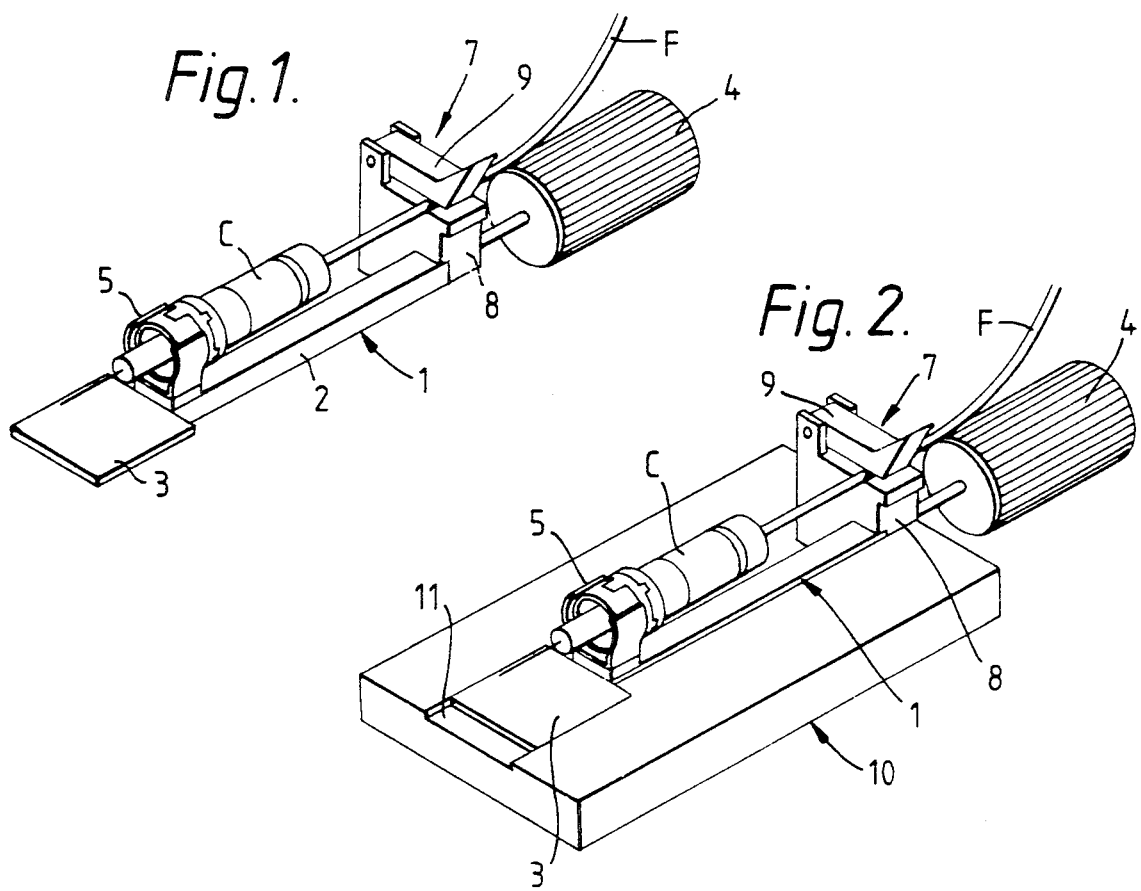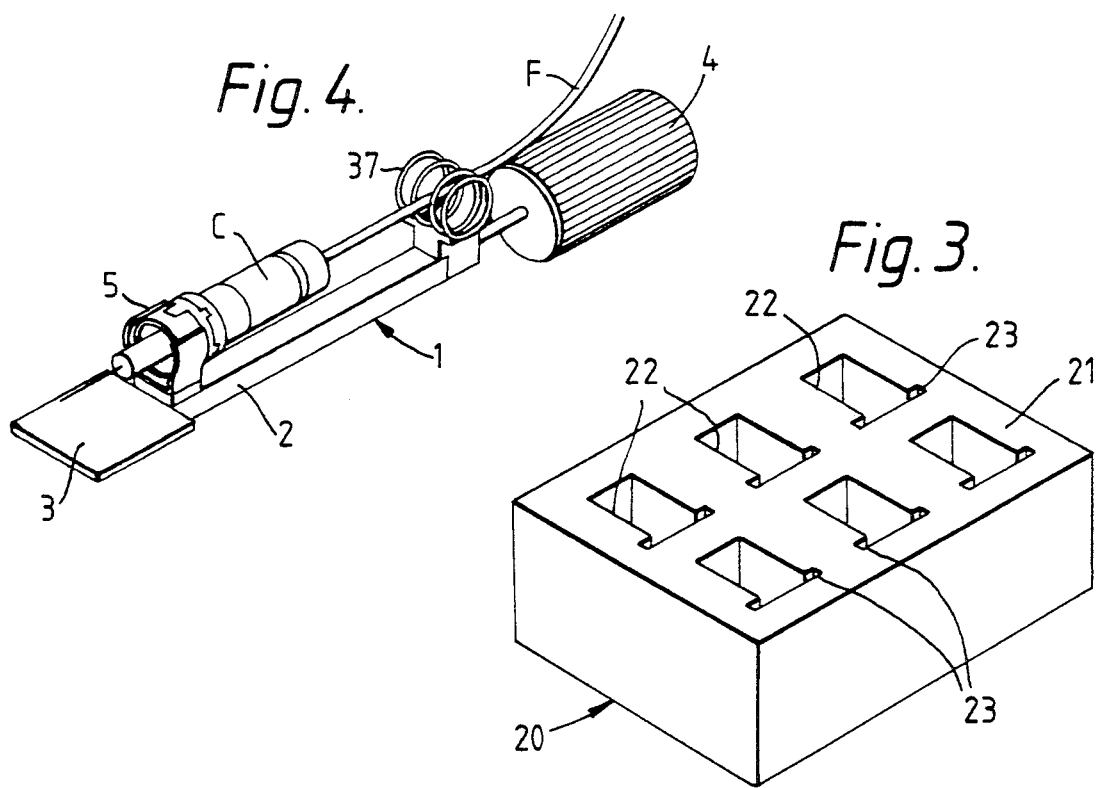

OPTICAL FIBRE TERMINATION METHOD AND APPARATUS

This invention relates to a device and apparatus for and a method of terminating an optical fibre in a connector body and is particularly concerned with a termination technique of the kind in which an end of an optical fibre is secured in the bore of a tubular connector body by use of an epoxy resin or other heat-hardenable adhesive.

In making a termination of this kind, an end of an optical fibre is vulnerable to damage, especially before the adhesive has hardened, because of the possibility of relative movement between the optical fibre and the relatively heavy connector body; additionally, there is a substantial risk that breakage of an optical fibre may occur when the connector body with the optical fibre therein is positioned in a heating device by means of which the adhesive is caused to harden.

It is an object of the present invention to provide an improved device and improved apparatus for and an improved method of terminating an optical fibre in the bore of a tubular connector body by means of which a reduction in the level of manual dexterity needed to ensure consistent satisfactory terminations can be achieved.

In accordance with the invention, the improved device comprises a movable support comprising an elongate face having first gripping means for holding a tubular connector body in a fixed position on the support, second gripping means for holding an optical fibre in a predetermined position in which the fibre extends through and protrudes from the bore of the connector body when so held, a tab protruding from one end of the elongate base and, disposed at the other end of the base, a thermally insulating handle by means of which the movable support can be transferred from a first mounting which facilitates ready positioning of the connector body and optical fibre to a second mounting which incorporates heating means for hardening of heat-hardenable adhesive employed to secure the optical fibre in the connector body.

Both the first and second gripping means may be resilient gripping devices, but preferably the second gripping means for holding an optical fibre is one that can be changed from a gripping condition to a release (non-gripping) condition without movement of the optical fibre. A preferred second gripping means comprises a pivotally mounted lever biased by a spring-loaded plunger acting on either of two surfaces of the lever to bias the lever towards or away from its gripping position.

The invention also includes improved apparatus for use in terminating an optical fibre in the bore of a tubular connector body, which improved apparatus comprises at least one terminating device as hereinbefore described; a first mounting on which the movable support of a terminating device can be so temporarily disposed that relative movement between the movable support and the first mounting is sufficiently inhibited to facilitate ready positioning of a connector body and optical fibre on the movable support; and a second mounting in or on which the movable support of a terminating device can be temporarily disposed, which second mounting incorporates heating means for hardening of heat-hardenable adhesive employed to secure the optical fibre in the connector body and comprises a block of metal or metal alloy having in a surface of the block at least one opening into which the moveable support of a terminating device, with a connector body and optical fibre held thereon, can be temporarily positioned, said opening having along one boundary edge a slot for initially receiving the tab of the removable support of a terminating device.

Preferably, the first mounting is a body having a substantially flat surface in which is a recess of such a shape and size that the elongate base of a terminating device will fit therein and will be restrained against lateral and rotational movement with respect to the first mounting.

The invention further includes a improved method of terminating an optical fibre in the bore of a tubular connector body using the improved apparatus hereinbefore described, which method comprises the steps of: providing a movable support having an elongate base with a first gripping means for holding the tubular connector body in a first position on the movable support and a second gripping means for holding an optical fibre in a predetermined position such that the fibre extends through and protrudes from the connector body, the movable support having a tab protruding from one end of the elongate base and having a thermally insulating handle disposed at the other end of the base; providing a first mounting for temporarily securing the movable support for facilitating positioning of the connector body and the optical fibre on the movable support; providing a second mounting having heating means for heating a heat-hardenable adhesive for securing the optical fibre in the connector body, the second mounting having at least one opening into which the movable support, with the connector body and the optical fibre held thereon, can be temporarily positioned, said opening having along one boundary edge a slot for initially receiving the tab of the movable support; temporarily securing the movable support to the first mounting for preventing relative movement therebetween; mounting the tubular connector body to the first gripping means of the movable support; mounting the optical fibre to the second gripping means in a predetermined position such that the fibre extends through and protrudes from the connector body; removing the movable support from the first mounting; temporarily positioning the movable support in the opening of the second mounting such that the tab of the movable support is received in the slot of the opening; and heating the connector body in the second mounting for hardening a heat-hardenable adhesive employed to secure the optical fibre in the connector body.

The invention will be further illustrated by a description, by way of example, of a preferred device for terminating an optical fibre in the bore of a tubular connector body with reference to the accompanying drawings, in which:

FIG. 1 is a perspective sketch of the movable support of the preferred device;

FIG. 2 is a perspective sketch of the movable support shown in FIG. 1 mounted on a first mounting;

FIG. 3 is a perspective sketch of a second mounting to which the movable support shown in FIG. 1 is to be transferred, and FIG. 4 is a perspective sketch of the movable support of a modified form of the preferred device.

Referring to the drawing, the movable support 1 shown in FIGS. 1 and 2 comprises an elongate base 2 having at one end a rectangular tab 3 and, at the other end, a handle for of thermally insulating material. Mounted on the base 2 are first gripping means consisting of a spring clip 5 for holding a tubular connector body C and second gripping means 7 for holding an optical fibre F, the second gripping means comprising a fixed jaw 8 and a second jaw constituted by a pivotally mounted lever 9. The lever 9 is acted on by spring-loaded plunger (not visible) mounted in the fixed jaw 8 and acting on the lever to the left (as seen in FIGS. 1 and 2) of the pivotal axis of the lever. When the lever 9 is in the gripping position, the spring-loaded plunger biases the lever towards the fixed jaw 8, but if the lever is manually lifted against the bias, the plunger acts instead on the end face of the lever to hold the lever in the release position. In practice, the lever 9 may be released simply by flicking it with a finger.

In use, the elongate base 2 of the movable support 1 is positioned in a recess 11 in a flat surface of a first mounting 10 (FIG. 2), the walls of which recess prevent lateral and rotational movement of the movable support with respect to the first mounting while a tubular connector body C, whose bore contains epoxy resin or other heat-hardenable adhesive, is snapped into the spring clip 5. With the lever 9 in the release position, an optical fibre F is then positioned on the fixed jaw 8 and is fed into the bore of the connector body C until an end of the fibre protrudes from the connector body but does not project beyond the end edge of the tab 3 of the movable support 1. When the optical fibre F has been so positioned, the lever 9 is moved to its gripping position as shown in FIGS. 1 and 2, to n, grip the optical fibre with its end correctly located ith with respect to the connector body C. Alternatively, an optical fibre F can be positioned in the bore of a tubular connector body C before the connector body is snapped into the spring clip 5.

The movable support 1 is now removed from the first mounting 10, when the movable support is in the condition shown in FIG. 1, and is inserted, in a vertically downwards direction, into a second mounting 20 (FIG. 3) which consists of a block 21 of metal or metal alloy with individual openings 22 for receiving a plurality of movable supports 1, each opening having along one boundary edge a slot 23 for receiving the tab of a movable support. Because the tab 3 will enter the slot 23 before the protruding end of the optical fibre F mounted on the movable support 1 can enter the opening 22 risk of damage to the end of the optical fibre is substantially reduced.

The metal block 21 is heated to a suitable temperature for hardening of the epoxy resin or other heat-hardenable adhesive inside the bore of the connector body C. After a suitable hardening period has elapsed, the movable support 1 is returned to the first mounting 10 to cool. The optical fibre F is now sufficiently firmly secured in the bore of the connector body C to eliminate risk of relative movement between the optical fibre and the connector body and to reduce substantially risk of breakage of the optical fibre during subsequent handling when cleaving and polishing of the protruding end of the optical fibre are effected. Cleaving of the optical fibre F is best done before the connector body C is removed from the movable support 1. If the connector body C is made in more than one part, if appropriate the parts may be assembled in the first gripping means 5 either before or after an optical fibre F is positioned on the movable support 1.

FIG. 4 shows a modified form of the preferred device in which the second gripping means 7 is constituted by a resilient gripping device in the form of a coil spring 37 having dimensions and spring characteristics such that an optical fibre F can be gripped simply by pressing it between turns of the spring.

What I claim as my invention is:

1. A method of terminating an optical fibre in the bore of a tubular connector body, said method comprising the steps of: providing a movable support having an elongate base with a first gripping means for holding the tubular connector body in a first position on the movable support and a second gripping means for holding an optical fibre in a predetermined position such that the fibre extends through and protrudes from the connector body, the movable support having a tab protruding from one end of the elongate base and having a thermally insulating handle disposed at the other end of the base; providing a first mounting for temporarily securing the moveable support for facilitating positioning of the connector body and the optical fibre on the movable support; providing a second mounting having heating means for heating a heat-hardenable adhesive for securing the optical fibre in the connector body, the second mounting having at least one opening into which the movable support, with the connector body and the optical fibre held thereon, can be temporarily positioned, said opening having a long one boundary edge a slot for initially receiving the tab of the movable support; temporarily securing the movable support to the first mounting for preventing relative movement therebetween; mounting the tubular connector body to the first gripping means of the movable support; mounting the optical fibre to the second gripping means in a predetermined position such that the fibre extends through and protrudes from the connector body; removing the movable support from the first mounting; temporarily positioning the movable support in the opening of the second mounting such that the tab of the movable support is received in the slot of the opening; and heating the connector body in the second mounting for hardening a heat-hardenable adhesive employed to secure the optical fibre in the connector body.

2. A device for terminating an optical fibre in the bore of a tubular connector body, which device comprises a movable support comprising an elongate base having first gripping means for holding a tubular connector body in a fixed position on the support, second gripping means for holding an optical fibre in a predetermined position in which the fibre extends through and protrudes from the bore of the connector body when so held, a tab protruding from one end of the elongate base and, disposed at the other end of the base, a thermally insulating handle by means of which the movable support can be transferred from a first mounting which facilitates ready positioning of the connector body and optical fibre to a second mounting which incorporates heating means for hardening of heat-hardenable adhesive employed to secure the optical fibre in the connector body.

3. A terminating device as claimed in claim 2, wherein the second gripping means for holding an optical fibre is of such a form that the gripping means can be changed from a gripping condition to a release (non-gripping) condition without movement of the optical fibre.

4. A terminating device as claimed in claim 3, wherein the second gripping means comprises a pivotally mounted lever biased by a spring-loaded plunger acting on either of two surfaces of the lever to bias the lever towards or away from its gripping position.

5. A terminating device as claimed in claim 2, wherein the second gripping means is a resilient gripping device.

6. A terminating device as claimed in claim 5, wherein the second gripping means is a coil spring having dimensions and spring characteristics such that an optical fibre can be gripped by pressing it between the turns of the spring.

7. A terminating device as claimed in claim 2, wherein the first gripping means is a resilient gripping device.

8. A terminating device as claimed in claim 7, wherein the first gripping means is a spring clip.

9. A terminating device as claimed in claim 2, wherein the tab at said one end of the elongate base is of rectangular shape.

10. Apparatus for use in terminating an optical fibre in the bore of a tubular connector body, which apparatus comprises at least one terminating device having a movable support comprising an elongate base having first gripping means for holding a tubular connector body in a fixed position on the support, second gripping means for holding an optical fibre in a predetermined position in which the fibre extends through and protrudes from the bore of the connector body when so held, a tab protruding from one end of the elongate base and, disposed at the other end of the base, a thermally insulating handle by means of which the movable support can be transferred from a first mounting which facilitates ready positioning of the connector body and optical fibre to a second mounting which incorporates heating means for hardening of heat-hardenable adhesive employed to secure the optical fibre in the connector body; a first mounting on which the movable support of a terminating device can be so temporarily disposed that relative movement between the movable support and the first mounting is sufficiently inhibited to facilitate ready positioning of a connector body and optical fibre on the movable support; and a second mounting in which the movable support of a terminating device can be temporarily disposed, which second mounting incorporates heating means for hardening of heat-hardenable adhesive employed to secure the optical fibre in the connector body and comprises a block of metal or metal alloy having in a surface of the block at least one opening into which the movable support of a terminating device, with a connector body and optical fibre held thereon, can be temporarily positioned, said opening having, along one boundary edge, a slot for initially receiving the tab of the movable support of a terminating device.

11. Apparatus as claimed in claim 10, wherein the first mounting is a body having a substantially flat surface in which is a recess of such a shape and size that the elongate base of a terminating device will fit therein and will be restrained against lateral and rotational movement with respect to the first mounting.

* * * * *